July 14, 1936.  V. J. SWANSON ET AL  2,047,806

PISTON RING

Filed March 19, 1934

Inventors:
Verner J. Swanson &
James L. Yarian
By H. W. Willyter
Atty.

Patented July 14, 1936

2,047,806

UNITED STATES PATENT OFFICE 2,047,806

PISTON RING

Verner J. Swanson, Elmhurst, and James L. Yarian, Chicago, Ill.; said Yarian assignor to said Swanson Application March 19, 1934, Serial No. 716,230

6 Claims. (Cl. 309—24)

This invention relates to piston rings adapted for conventional use in gasoline and oil internal combustion automobile motors and the like but overcomes the disadvantages of the types of piston rings now in use.

The rings heretofore used have failed to provide proper oil and pressure seals, they have worn out too rapidly, they have caused damage to cylinder walls through sticking, breaking and melting, they have failed to conduct away the heat from the piston head, and in general they have not been entirely satisfactory.

This invention therefore has among its objects:

The provision of a piston ring which is commercially practicable to manufacture, use and sell.

The provision of a piston ring which is readily installed and is applicable to existing piston designs.

The provision of a piston ring which will efficiently seal compression in a cylinder.

The provision of a piston ring which will control the amount of oil reaching the combustion chamber of a cylinder.

The provision of a piston ring which will not become inefficient because of rocking of the piston.

The provision of a piston ring which will properly allow and compensate for expansion and contraction of piston and cylinder walls.

The provision of a piston ring which will prevent dilution of the motor oil by gasoline from the combustion chamber.

The provision of a piston ring which will need little or no breaking in or running in but which will have a long life.

The provision of a piston ring which will prevent carbonization of the oil film on the cylinder wall.

The provision of a piston ring which will avoid ring flutter and similar troubles.

The provision of a piston ring which will not cause the piston to be weakened.

The provision of a piston ring which will exert a uniform radial pressure at all times, will not stick in the groove, will be self centering in the groove, will be flexible enough to follow slight variations in the cylinder wall, will not depend for its operation upon the allowance of a certain clearance for the skirt, will keep friction at a minimum, will not affect the operation or construction of other parts of the engine, will not depend on a particular grade of oil, will not depend on springs or the like, will allow concentration of rings at the head of the piston, and will avoid the building up of cylinder pressures behind the ring, and will provide a flat surface in contact with the cylinder wall.

Other objects and functions, including the provision of a unique structure for a piston ring, will appear.

The principal objections to the present types of piston rings are that in order to seal the pressure and the oil the tension has to be unduly increased, must be run a long time to be broken in and seated properly, at which time they are usually worn out. It did not conduct away the heat from the piston head, it was either fragile or else too stiff to allow ready installation. In many other ways it was not satisfactory and its form as commonly seen at present is only a compromise, an attempt to remedy an ill without curing it.

The present invention overcomes the difficulties by the use of hydraulic pressure, broad bearing surfaces, line contacts with the piston, the use of rounded or beveled inner corners, and an entirely new design and principle of construction and operation.

The preferred embodiment of the invention is more fully explained with reference to the single drawing hereby made a part of this specification. In the drawing.

Like reference characters are used to designate similar parts in the drawing and in the description of the invention which follows.

Figure 1:
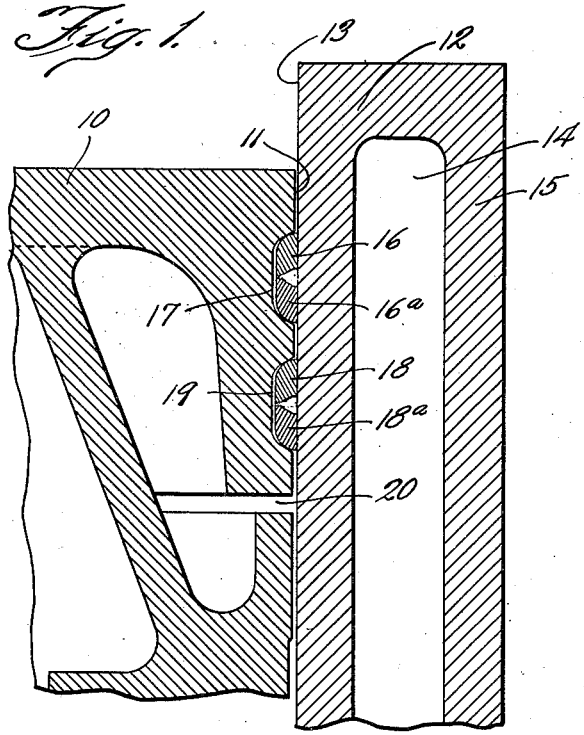
Figure 1 shows a partial cross section of a cylinder head and a piston head using the preferred embodiment of the invention.

Referring to Figure 1, the piston 10 is shown in position in a cylinder, with the side 11 of the piston in a relation of normal clearance with the surface 13 of the cylinder wall 12. This clearance is exaggerated in the drawing for purposes of clearness.

On the outside of the cylinder wall is the usual space 14 for the circulation of water and the customary jacket 15 around this water space. The piston rings 16 and 16a are in place in ring groove 17 and rings 18 and 18a in groove 19. The number of pairs of rings may be varied without departing from the spirit of the invention.

Below the second pair of rings, in this preferred embodiment of the invention, there is an aperture 20 in the piston wall to allow for the ready escape of surplus oil.

Figure 2:
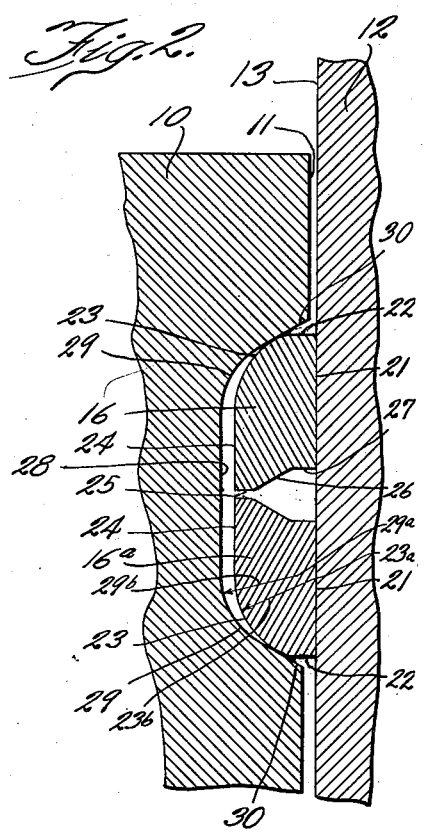
Figure 2 is an enlarged view of a portion of the same section showing one of the sets of rings and the manner of laying out the various curves and angles.

The rings 16 and 16a, and 18 and 18a, are used in pairs, each member of which is complemental to the other. The enlargement in Figure 2 shows them clearly as to shape and relationship. The outer surface 21 of each ring is machined to be accurately cylindrical and is usually honed to a mirror-like finish. This cylindrical surface terminates in a sharp corner where it is intersected by the plane surface 22 on each ring. This plane surface is at right angles to the axis of the ring. The plane surface merges into the rounded corner 23 which in turn merges into an inner cylindrical surface 24 parallel to the cylindrical surface 21. This cylindrical surface is intersected to form a second sharp corner by the plane surface 25, which is at right angles to the axis of the ring and parallel to the plane of the surface 22. The other boundary of plane surface 25 is a cone-shaped surface 26, indicated lying diagonally in the sections shown. Such surface leads into a third plane surface 27, parallel to the others, which forms a second sharp and right angled corner with the outer cylindrical surface 21.

The two rings of the pair are identical. It is apparent that they may be used in conjunction, with the plane faces 25 in contact or separated as circumstances require.

The groove 17 in which the rings are used is cut into the wall of the piston. Its depth is greater than the thickness of the ring from face 21 to face 24 and its vertical dimension at the face of the piston as indicated is greater than the corresponding dimension of the two rings used in it. The amount by which the vertical dimension is greater than the corresponding dimension of the two rings may be varied to suit conditions, but for average use it has been found that this dimension should equal slightly more than the corresponding dimension of the two rings together.

The inner face 28 of the groove is cylindrical except where it merges into the rounded corners 29. The conformation of these corners is critical. They must be cut on a curve and merged into the adjoining surfaces in such a way that the contact between the wall of the groove and the surface of the ring is only at a comparatively narrow line around the ring and groove. The outer part 30 of the groove is cut to a conical shape which is intersected at an angle by a hypothetical continuation of the plane surface 22.

This angle may be varied to suit circumstances but it has been found best to make it thirty degrees from a perpendicular to a plane tangential to the cylindrical surface 11. The radii of the curves 23 and 29 may be varied within limits, as may be the location of their centers, provided that the shapes be such that the narrow line of contact is maintained and the groove is wider at its mouth than at its inner parts.

It has been found that when the ring is considered as in contact with one or the other side of the groove the centers 23a and 29a may be on a line a little less than half the distance from the outer edge of the ring to the center of the groove, the center 23a for the radius 23b of curve 23 may be at the position of the surface of the adjacent cylinder wall 13 and the center 29a for curve 29 separated therefrom by about one fourth of the distance from such wall to the bottom 28 of the groove.

The radius 23b may be slightly greater than radius 29b, the two being, for instance in the ratio of 125 and 115. These dimensions as well as the others found best in the particular case, and the placement of the various centers and the like, are shown in Figure 2. These may all be varied in amount and in respective proportions to suit the particular case and are shown merely as an illustration and as a guide to proportioning and placement.

When the rings are placed in the groove on the piston they are free and have some room for movement. When they are together the two faces 25 are in contact. When displaced towards one side of the groove contact and seal is made with that side. When displaced toward the other side the contact and seal is there. The two rings may be separated within the groove, leaving a space between faces 25, which is the operating position of the rings.

At all times there is an open space between faces 26 and 27 and a space between the inner face 28 of the groove and the faces 24. The outer face 21 of the ring is in uniform and sealing contact with the cylinder wall 13, and the corners bounding such contacting ring face are sharp and at ninety degree angles.

Figure 3:
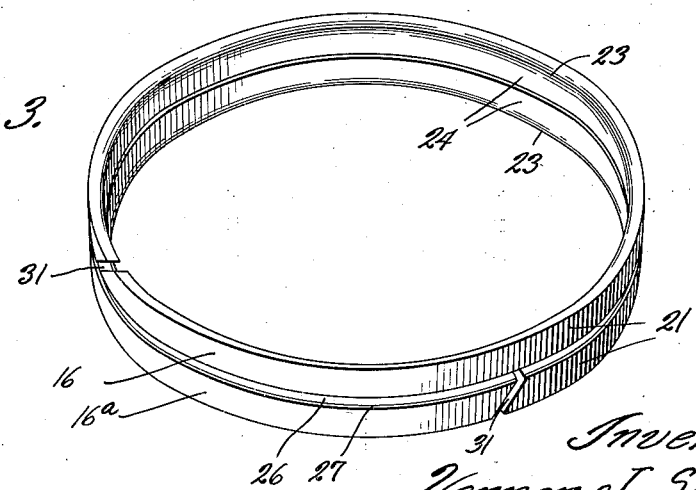
Figure 3 is a perspective view of the two rings which are used together as one.

A diagonal opening cut 31 shown in Figure 3 is provided in each ring to allow it to be expanded or contracted. This slot need not be diagonal as shown but may be vertical or of any desired shape.

As shown by the drawing the rings are comparatively wide and shallow, whereas most other rings are narrow and deep. The proportioning of these new rings, as compared to old ones, allows great flexibility, easier application, less breakage, and less friction.

In installing these new rings, it is wise to flood both the rings and the grooves with oil before inserting the piston into the cylinder. A large part of this oil will be trapped behind the ring to form a cushion, the effect which is of great importance. After the engine is in operation the normal supply of oil in the cylinder will keep the cushion replenished.

The operation of the rings in the cylinder is as follows:

On the intake stroke the piston moves down. The inertia of the rings and their drag against the cylinder walls causes them to move to the top of the grooves. This seals the explosion chamber with a line seal which promotes efficient suction. At the same time the lower sharp corner of the lower ring scrapes oil from the cylinder wall and causes it to flow into the space behind the rings, and the lower sharp edge of the top ring in the same way fills with oil the open space between the rings.

On the compression stroke the piston is moving upward and the inertia and drag of the rings cause them to move relatively downward in the groove, the lower one forming a sealing line contact between its own rounded surface and the inclined surface of the groove. The fact that the space behind the rings is already filled with oil prevents any of the gas in the explosion chamber from escaping into that space.

To this oil is added what is scraped from the surface of the cylinder by the upper edge of the ring. The space between the two rings is again kept filled in the same way. The pressure of the gases in the explosion chamber acts upon the oil in the space behind the rings, creating a hydraulic pressure there which forces the rings into close contact with the cylinder wall. To this hydraulic pressure is added the effect of the outward resultant force of the pressure of the slanted groove wall upon the rounded surface of the lower ring.

A close seal with the cylinder wall is therefore produced and since the lower ring is flexible and the pressure of the oil as well as of the slanted surfaces is uniform throughout, the pressure of the lower ring upon the cylinder wall is uniform all around, and there are no open spaces between the ring and the cylinder wall.

Only a very thin film of oil is allowed to remain at any place on the cylinder wall. This film of oil is never entirely removed by the rings, but rather is constantly replenished by the oil in the openings between and around them while the rings themselves restrict it to an ideal minimum thickness.

When the motor is in operation, just before the charge in a cylinder is ignited the top ring leaves its contact with the lower ring and makes contact with the inclined wall of the groove. Therefore the two rings are spaced apart and are kept so by the building up of oil pressure because the conical space between them collects oil from the cylinder wall. The rings are now in their normal operating position, i. e., each of the rings makes contact between its rounded side and the inclined side of the groove nearest this rounded side, and the surfaces 25 are therefore spaced apart so that the oil can travel to the back of the ring. The rings do not leave their contact with the groove sides as the pressure in the oil cushion keeps them tight up against the groove side. These rings do not bounce back and forth in the groove.

The explosion pressure cannot force the top ring away from contacting with the groove sides as the pressure in the oil cushion overcomes the gaseous pressure.

At the end of the explosion stroke the rings are still spaced apart and so remain through the exhaust stroke.

Thus this new piston ring is in effect cushioned on oil and held by surfaces shaped so that they cannot bind or stick and so that a positive seal is formed in whichever direction the piston is moving. The rounded surfaces of the groove and rings allow movement of the line of contact and seal. The ring is not held immovably in a single position and at a single angle as are ordinary rings, but is properly spoken of as floating because it is able to adapt itself to minor variations in the relative angle of the piston wall. Thus rocking of the piston will not cause the outer surface of the ring to become rounded as that surface is held flat against the cylinder wall, rather than at an angle thereto. For that reason the edges of the bearing surface of the ring remain always sharp right angles and the efficiency of the ring in controlling the amount of oil on the cylinder wall of the explosion chamber is always retained.

The film of oil left on the cylinder wall by the rings is always at the extreme of thinness, and while always present is so thin that there is no retardation of heat transmission. The oil on the wall in the explosion chamber is therefore not carbonized by the heat because that heat is transmitted through it and into the wall and the water jacket and so dissipated.

The same thinness of oil allows heat to be readily transmitted from the piston rings to the cylinder wall. In addition, the wide face of the rings provides a heat transmission area practically as great as the area of the head of the piston so that not only is transmission away from the piston facilitated but sufficient means of transmission is available. The rings are near the head of the piston, the most efficient place for cooling the piston, and since the piston is cooled principally by transmission of the heat through the rings an efficient operating piston temperature is made possible.

Heretofore this has been attempted by the use of many rings or like expedients, but the result has been increased friction and loss of power or some similar drawback so that earlier proposed solutions were but compromises.

The fact that piston rocking is of no particular disadvantage with these new rings does away with the necessity for long and very closely machined skirts on the pistons, thus allowing a saving in weight and cost.

It must be understood that conditions in an operating engine are not the same as those in a dismantled one and to the usual factors of measurements and angles and the like in the static machine must be added the factors of velocity and inertia and acceleration and friction. This invention is based upon those factors and takes advantage of them to secure efficient operation. It must also be understood that variations in shape, size and position of the members herein described may be made without departing from the spirit of the invention.

What is claimed as new and is desired to be secured by Letters Patent of the United States is:

1. In an internal combustion engine the combination of a piston having in the cylindrical wall thereof an annular groove with rounded inner corners and diverging upper and lower walls, said groove being of greater width than depth, and two complemental and identical split piston rings of less thickness than the depth of said groove and of less total width than the width of said groove, said rings each having one face of a plane surface with the adjacent corner rounded, the opposite face of said rings comprising a second plane opposite said rounded corner, a third plane opposite said first plane, and a conical surface between said second and third planes, the inner and outer surfaces of said rings being cylindrical, said rounded corner being shaped to meet the inclined side of said groove on a line, said second plane faces being approximated and said third plane faces and said conical faces being spaced apart when said rings are positioned in said groove.

2. The combination of a piston having in the cylindrical wall thereof a groove with diverging sides, and resilient complementary upper and lower piston rings of less width than and positioned in said groove, the upper ring having a rounded upper inner corner, and the lower ring having a rounded lower inner corner, said rounded portions of both rings being of less radius of curvature than said diverging sides, whereby said rings may move in said groove to make line contact with said sides, and each ring having a cylindrical outer face for flat contact with the wall of a cylinder.

3. The combination of a piston having in the cylindrical wall thereof a groove with rounded inner corners and diverging sides, and two resilient complemental upper and lower split piston rings of less width than said groove, the upper ring having a rounded upper inner corner and the lower ring having a rounded lower inner corner, said rounded portions of both rings being of less radius of curvature than said diverging sides, whereby said rings may move in said groove to make line contact with said sides, and each ring having a cylindrical outer face for flat contact with the wall of a cylinder.

4. In an internal combustion engine the combination of a piston having in the cylindrical wall thereof an annular groove and diverging upper and lower walls, and complemental piston rings of less thickness than the depth of said groove, said rings each having one face of a plane surface with the adjacent corner rounded, the opposite face of said rings comprising a second plane opposite said rounded corner, a third plane opposite said first plane, and a conical surface between said second and third planes, the inner and outer surfaces of said rings being cylindrical, said rounded corner being shaped to meet the diverging wall of said groove on a line, said second plane faces being approximated and said third plane faces and said conical faces being spaced apart when said rings are positioned in said groove.

5. In an internal combustion engine the combination of a piston having in its cylindrical wall an annular groove possessing diverging sides, and resilient complemental upper and lower piston rings in said groove, the upper ring having a rounded upper inner corner, and the lower ring having a rounded lower inner corner, said two rings being less wide than the mouth of said groove and wider than the bottom of said groove, the rounded corners of said rounded portions of both rings being of less radius of curvature than said diverging sides, whereby said rings may move in said groove on lines of contact with said sides, and each ring having a cylindrical outer face for flat contact with the walls of a cylinder.

6. In an internal combustion engine, the combination of a piston having in its cylindrical wall an annular groove possessing divergent sides, and complemental upper and lower piston rings in said groove, the upper ring having a rounded upper inner edge and a cut back lower outer edge, and the lower ring having a rounded lower inner edge and a cut back upper outer edge, the rounded edges of said rings meeting the sides of said groove on lines of contact, and said cut back edges being spaced apart.

VERNER J. SWANSON.
JAMES L. YARIAN.